US012753014B2

(12) United States Patent
Theron

(10) Patent No.: US 12,753,014 B2
(45) Date of Patent: Oct. 6, 2026

(54) OMNIDIRECTIONAL CONVEYOR MODULE

(71) Applicant: Intelligrated Headquarters, LLC, Mason, OH (US)

(72) Inventor: Quinton Eduard Theron, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 38 days.

(21) Appl. No.: 18/887,367

(22) Filed: Sep. 17, 2024

(65) Prior Publication Data

US 2026/0077955 A1 Mar. 19, 2026

(51) Int. Cl.
*B65G 29/00* (2006.01)

(52) U.S. Cl.
CPC ...... *B65G 29/00* (2013.01); *B65G 2203/0266* (2013.01); *B65G 2811/0647* (2013.01); *B65G 2812/016* (2013.01)

(58) Field of Classification Search
CPC .... B65G 29/00; B65G 47/1492; B65G 47/53; B65G 47/54; B65G 47/68; B65G 47/71; B65G 47/2445; B65G 47/80
See application file for complete search history.

(56) References Cited

U.S. PATENT DOCUMENTS 1,475,962 A * 12/1923 Olson .................... B65G 47/80 198/597
2,031,054 A * 2/1936 McCarthy ............ B65G 19/287 198/860.3
2,550,201 A * 4/1951 Parisi ..................... B65G 13/10 193/35 F
4,979,606 A * 12/1990 Usui ...................... B65G 13/12 198/782
8,978,879 B2 3/2015 Fourney
10,549,917 B2 2/2020 Garehan
10,793,367 B1 * 10/2020 Wedekind .............. B65G 47/80
11,319,155 B2 5/2022 Huang et al.
11,827,458 B2 * 11/2023 Para ..................... B65G 13/071
2025/0208155 A1 * 6/2025 Schommer ......... G01N 35/0099

FOREIGN PATENT DOCUMENTS

GB 1478757 A 7/1977

OTHER PUBLICATIONS

Omnia Wheel Ltd, "Omni Directional Sortation", Omnia Conveyor Brochure, dated Jun. 5, 2023, vol. 11, downloaded from the Internet at https://www.omniawheel.com/_files/ugd/71243f_320ec349b4024f30bd4b2ea87f071129.pdf, on Oct. 27, 2025, 12 pages.

* cited by examiner

*Primary Examiner* — William R Harp
(74) *Attorney, Agent, or Firm* — Alston & Bird LLP

(57) ABSTRACT

A conveyor module is disclosed. The conveyor module comprises a base and a plurality of rotating disks mounted on the bases. Each of the plurality of rotating disks comprise a top that is circular and a gripping surface positioned around the top. The gripping surface is configured to grip and propel one or more objects placed over the conveyor module in one or more directions based on rotation of the plurality of rotating disks.

20 Claims, 14 Drawing Sheets

OMNIDIRECTIONAL CONVEYOR MODULE

TECHNOLOGICAL FIELD

Example embodiments of the present disclosure generally relates to a conveyer module, and more particularly relates to a conveyer module adaptable for transporting objects or products in an omnidirectional manner.

BACKGROUND

Existing transfer system used in warehouses and retail and fulfillment environments lack modularity. For example, existing transfer systems are often conveyor systems that are large, permanent structures. Existing transfer systems are also often complex, not easily reconfigurable, and only capable of transferring objects in a single direction.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a conveyor module is disclosed. The conveyor module comprises a base and a plurality of rotating disks mounted on the base. Each of the plurality of rotating disks comprises a top that is circular and a gripping surface positioned around the top. The gripping surface is configured to grip and propel one or more objects placed over the conveyor module in one or more directions based on rotation of the plurality of rotating disks.

In some embodiments, the conveyor module further comprises a plurality of locking units and a plurality of connecting pins. The plurality of locking units is configured to interlock the conveyor module with another conveyor module.

In some embodiments, the conveyor module further comprises a plurality of connecting pins on each side of the base, wherein each of the plurality of connecting pins is configured to electrically couple the conveyor module with the another conveyor module.

In some embodiments, each of the plurality of connecting pins are pogo pins.

In some embodiments, the one or more directions comprise at least one of a linear direction movement, diagonal direction movement, or a rotational direction movement.

In some embodiments, the conveyor module further comprises a plurality of motors, wherein each motor of the plurality of motors is coupled to a corresponding rotating disk of the plurality of rotating disks, wherein each motor is configured to rotate the corresponding rotating disk either in a clockwise or an anti-clockwise direction. In some embodiments, the motor is a horizontally rotating permanent magnet synchronous motor (PMSM).

In some embodiments, the plurality of motors are configured to rotate each of the plurality of rotating disks at equal speeds to propel the one or more objects in the one or more directions. In some embodiments, the plurality of motors are configured to rotate some of the plurality of rotating disks at different speeds than other rotating disks to propel the one or more objects in the one or more directions.

In some embodiments, the plurality of motors are configured to rotate some of the plurality of rotating disks clockwise and other rotating disks anti-clockwise to propel the one or more objects in the one or more directions. At least some of the plurality of rotating disks are configured to counter-rotate with respect to other rotating disks to provide the linear direction movement or diagonal direction movement to the one or more objects.

In some embodiments, the conveyor module further comprises at least one control unit communicatively coupled to each motor of the plurality of motors. The at least one control unit is configured to receive an instruction related to a destination or a sorting criteria of each of the one or more objects from one or more input sources.

In some embodiments, the base of the conveyor module defines a shape, and the shape is a square shape.

In some embodiments, the conveyor module further comprises a plurality of adjustable feet coupled to a lower surface of the base. The plurality of adjustable feet provides a support for positioning the conveyor module over a stable surface.

In some embodiments, the top is concave.

In some embodiments, the gripping surface is annular and comprised of an elastomer, and the gripping surface defines a plurality of grooves that extend radially. In some embodiments, the gripping surface is convex.

In some embodiments, the conveyor module comprises at least sixteen rotating disks. Each of the plurality of rotating disks are configured to rotate on an axis that is orthogonal to a plane defined by the upper surface of the base.

In another example embodiment, a method is disclosed. The method comprising steps of mounting a plurality of rotating disks on a base of a conveyor module. Each rotating disk of the plurality of rotating disks comprises a top that is circular; and a gripping surface positioned around the top, wherein the gripping surface is configured to grip and propel one or more objects placed over the conveyor module in one or more directions based on rotation of the plurality of rotating disks.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1A:
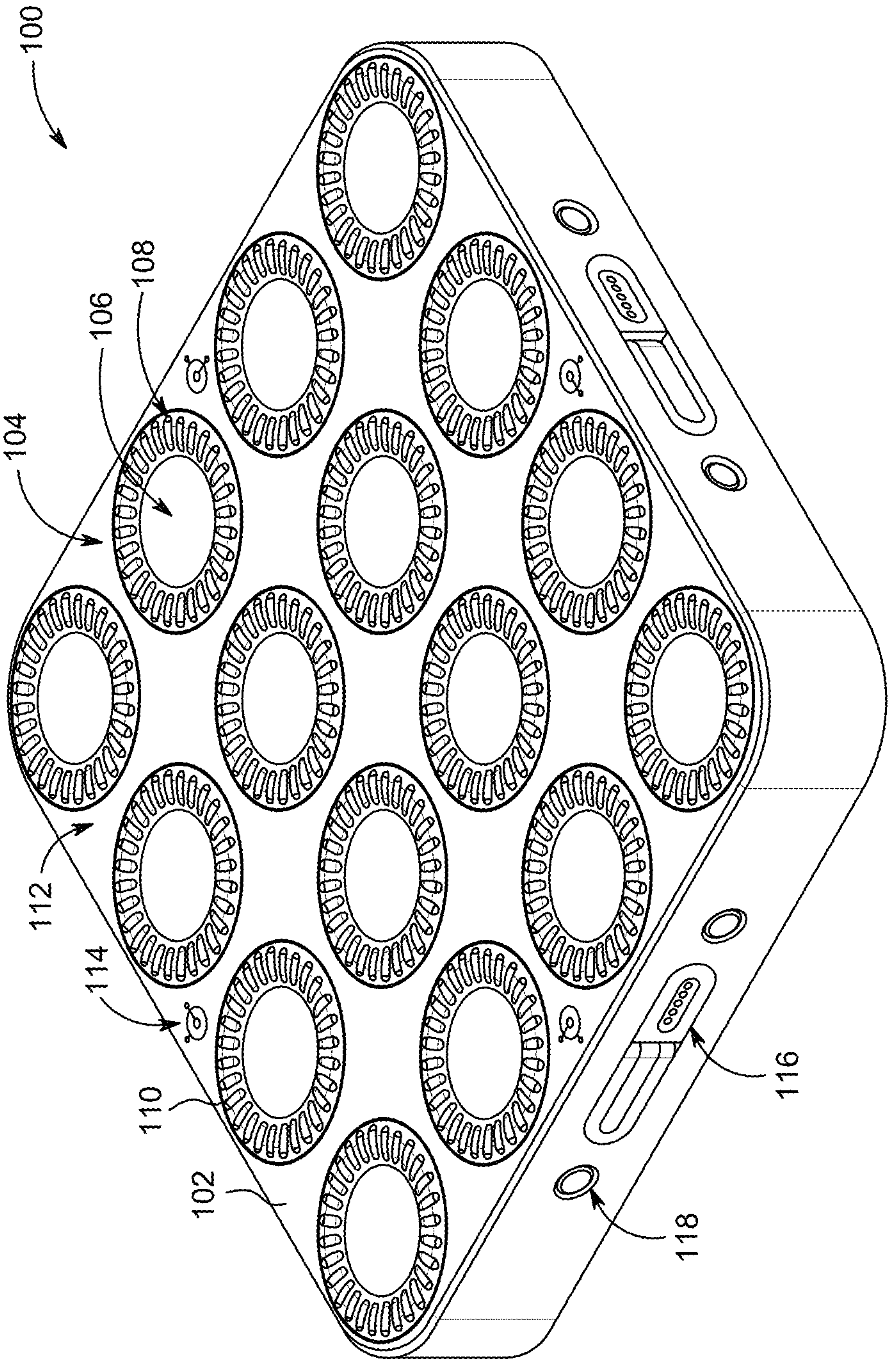
Figure 1B:
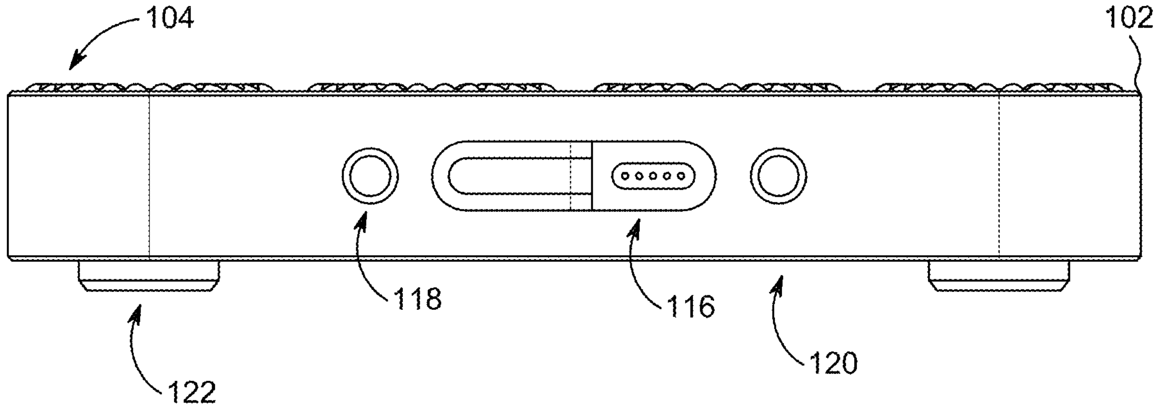
Figure 2A:
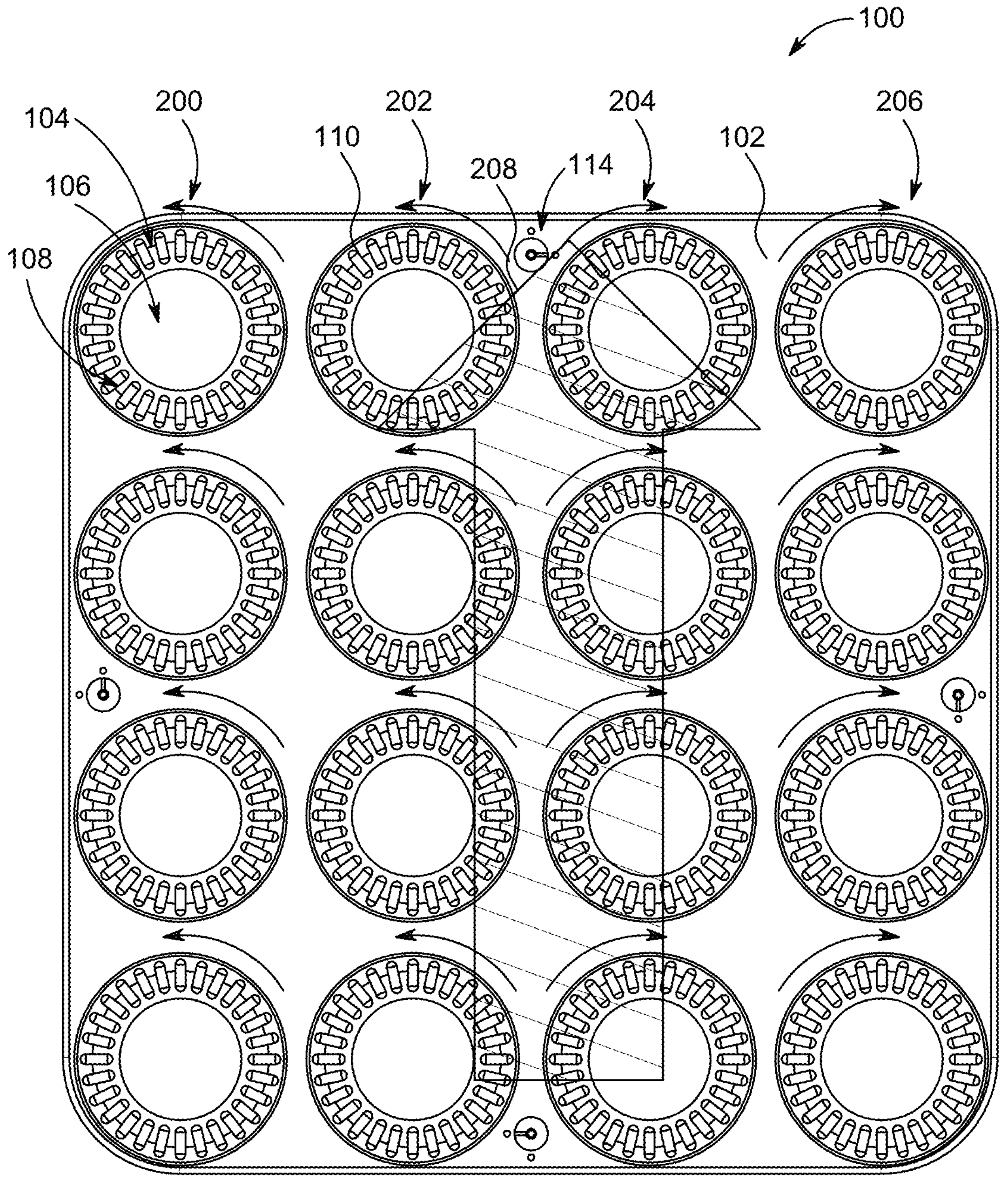
Figure 2B:
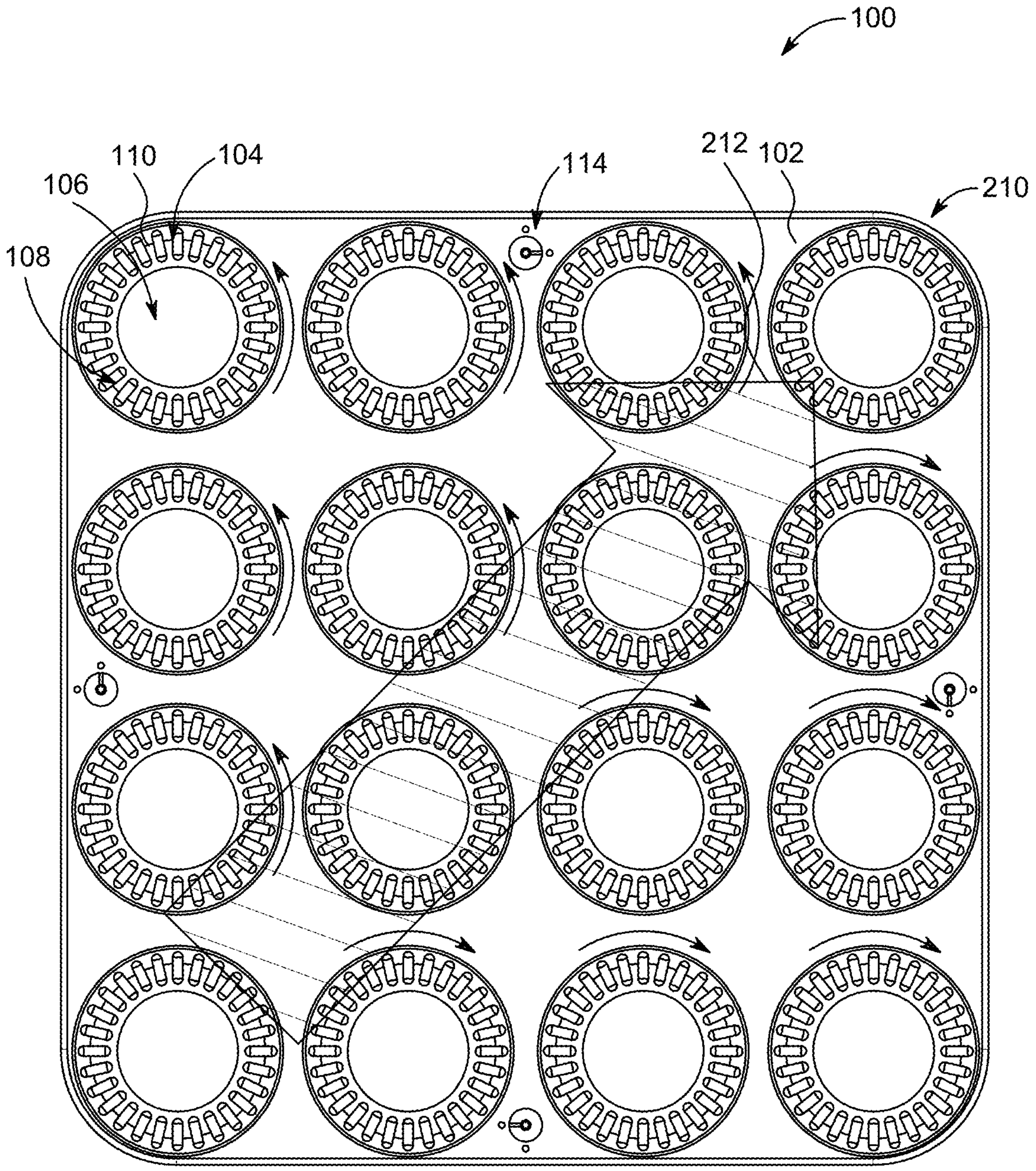
Figure 2C:
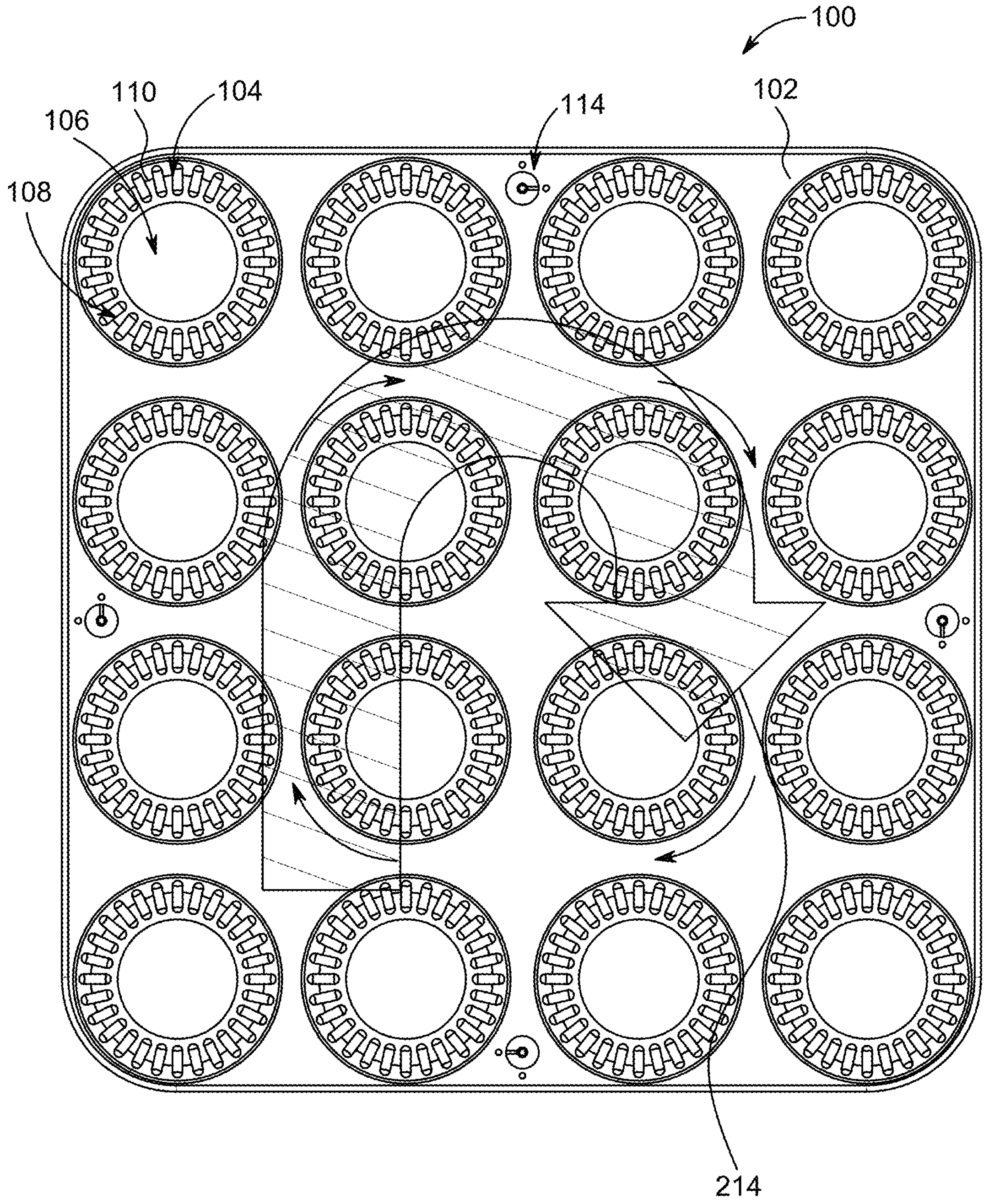
Figure 3A:
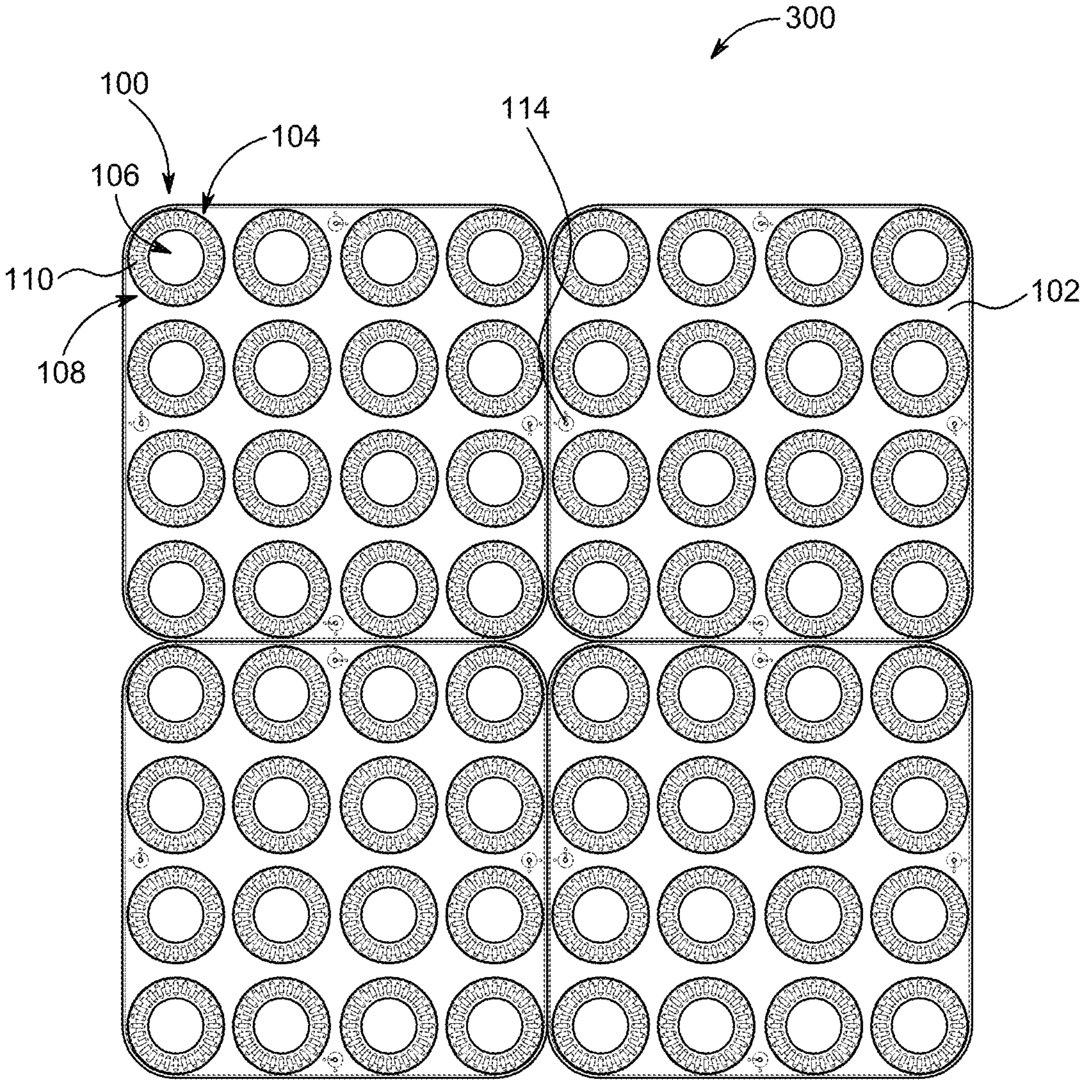
Figure 3B:
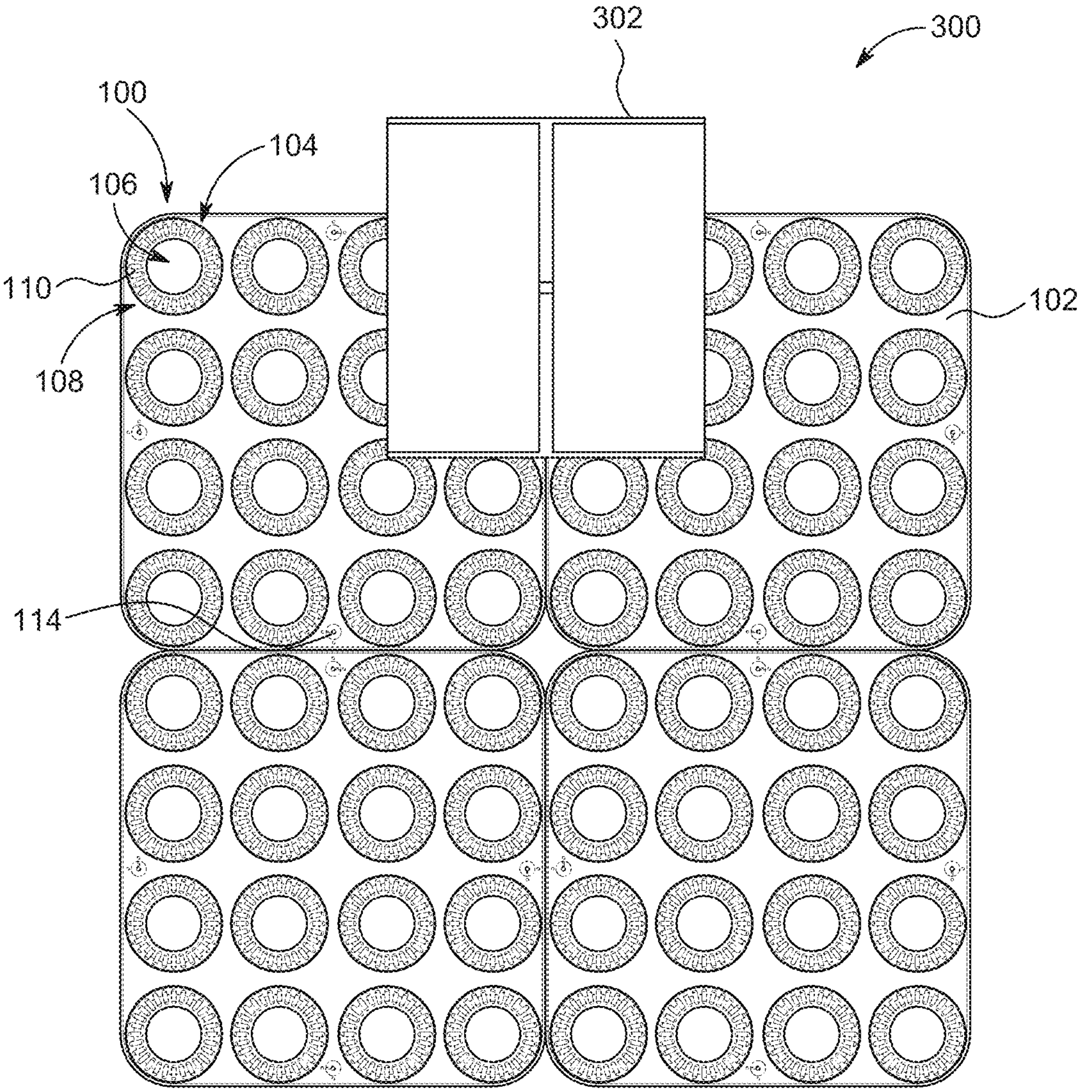
Figure 3C:
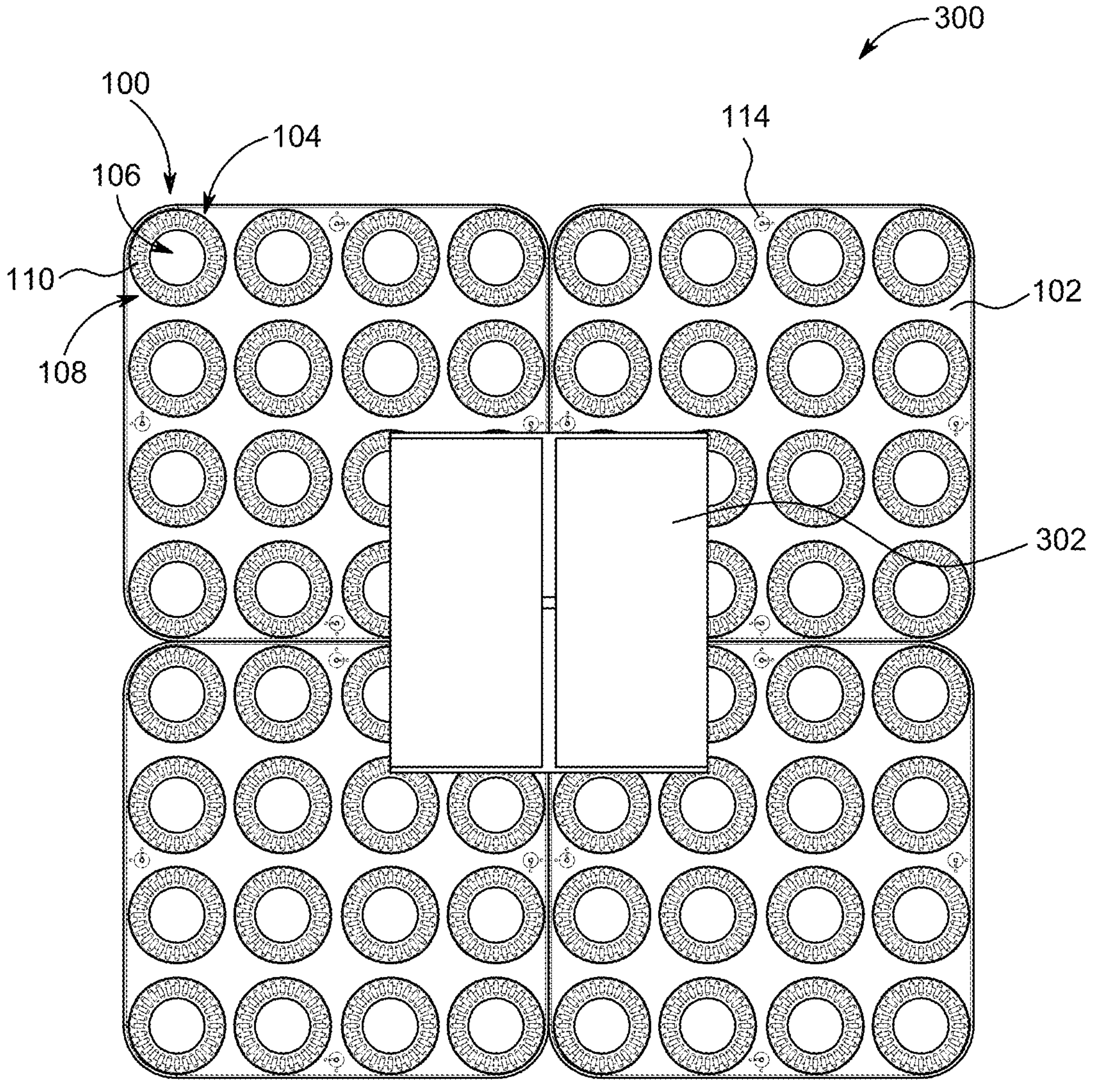
Figure 3D:
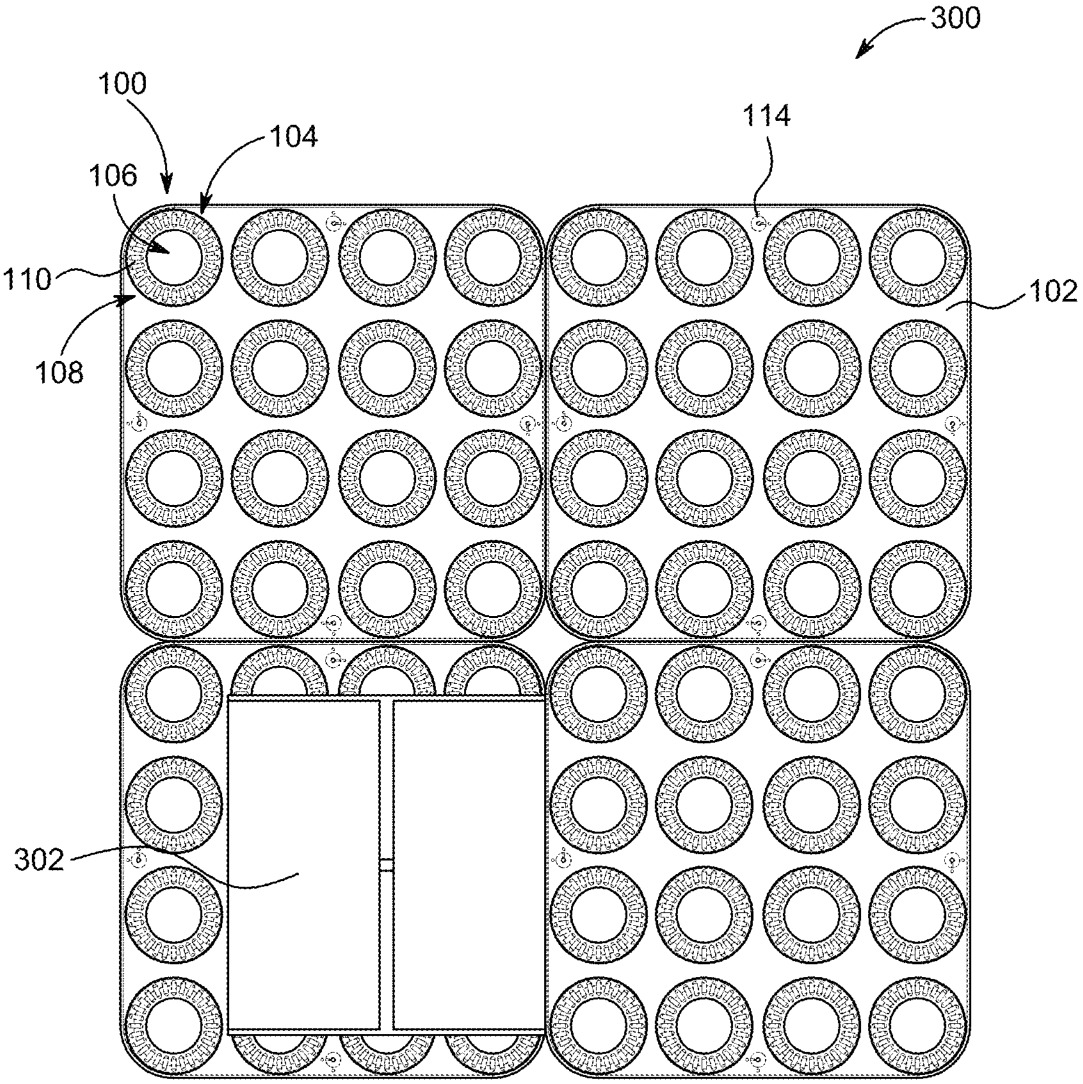
Figure 3E:
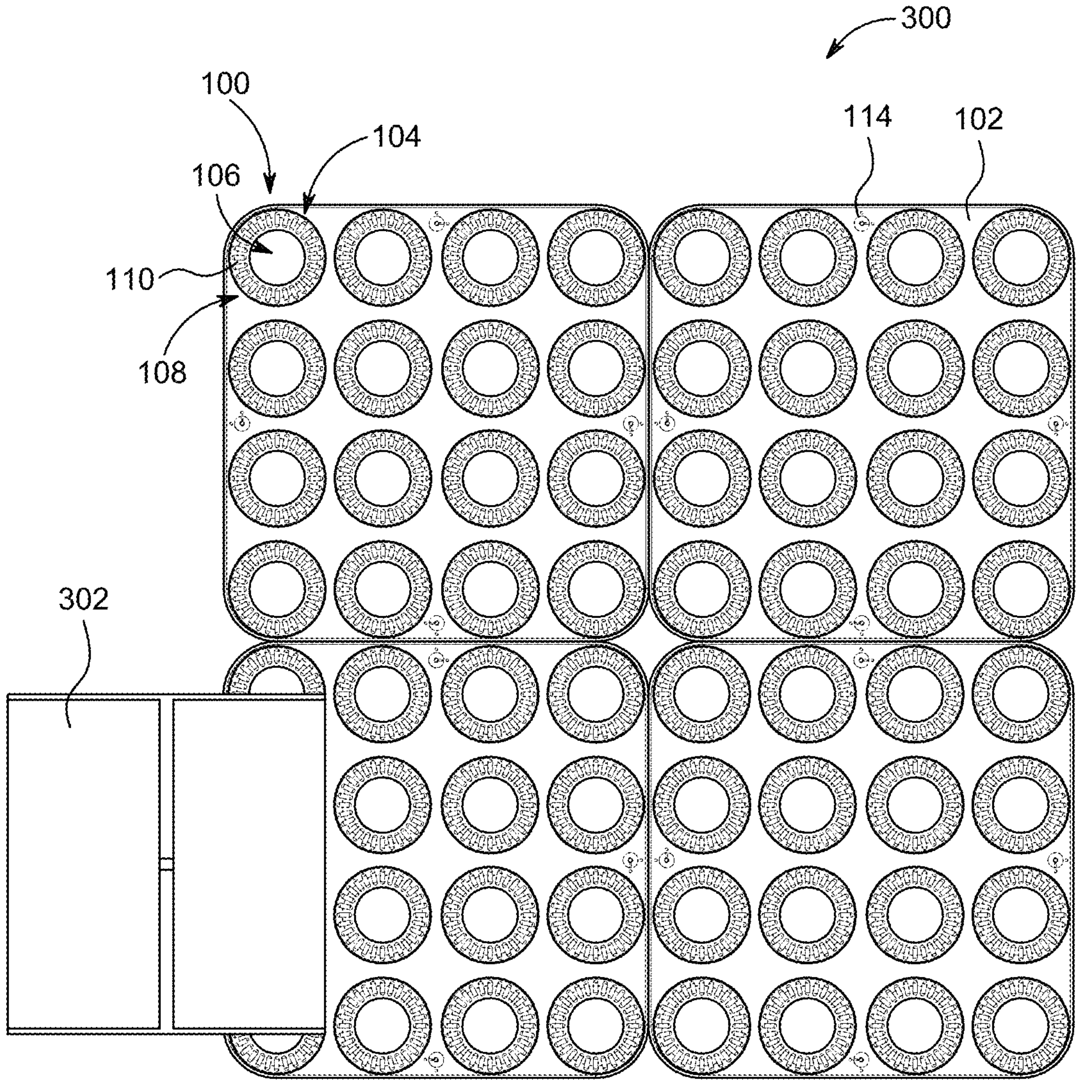

Having thus described certain example embodiments of the present disclosure in general terms, reference will hereinafter be made to the accompanying drawings, which are not necessarily drawn to scale, and wherein:

FIG. 1A illustrates an isometric view of a conveyor module in accordance with an example embodiment of the present disclosure;

FIG. 1B illustrates a side view of the conveyor module in accordance with an example embodiment of the present disclosure;

FIGS. 2A-2C illustrate top views of the conveyor module in accordance with an example embodiment of the present disclosure;

FIG. 3A illustrates a top view of a conveyor system having the conveyor module interlocked with another conveyor module in accordance with an alternate embodiment of the present disclosure;

FIGS. 3B-3C illustrate top views of the conveyor system propelling one or more objects in a linear direction in accordance with an example embodiment of the present disclosure;

FIGS. 3D-3E illustrate top views of the conveyor system propelling one or more objects in a left diagonal direction in accordance with an example embodiment of the present disclosure; and FIGS. 4A-4D illustrate top views of the conveyor system propelling one or more objects in a right diagonal direction in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of a conveyor module. Embodiments may comprise a base and a plurality of rotating disks. The plurality of rotating disks may be mounted on the base. Each rotating disk of the plurality of rotating disks comprises a top that is circular and a gripping surface positioned around the top. Embodiments may be configured to grip and propel one or more objects placed over the conveyor module in one or more directions based on rotation of the plurality of rotating disks.

FIG. 1A illustrates an isometric view of a conveyor module 100, in accordance with an example embodiment of the present disclosure. FIG. 1B illustrates a side view of the conveyor module 100, in accordance with an example embodiment of the present disclosure. FIGS. 2A-2C illustrate a top view of the conveyor module 100, in accordance with an example embodiment of the present disclosure.

In some embodiments, the conveyer module 100 may comprise a base 102. In some embodiments, the base 102 may define a shape. In an example, the base 102 may be of square shape. In some embodiments, the conveyor module 100 may comprise a plurality of adjustable feet 122 coupled to a lower surface 120 of the base 102. The plurality of adjustable feet 122 may provide a support for positioning the conveyor module 100 over a stable surface (e.g., a concrete floor of a building). In some embodiments, a plurality of rotating disks 104 may be mounted on the base 102. In an example, the plurality of rotating disks 104 may be aligned linearly to form arrays. For example, the arrays may be aligned parallel to at least one side of the conveyor module, orthogonal to at least one side of the conveyor module, or diagonally along a top surface of the conveyor module 100 (e.g., at a 45 degree angle relative to at least one side of the conveyor module). For example, considering the base 102, the arrays may be aligned horizontally in a context that the arrays may be aligned in a X-axis direction and a Y-axis direction that extend horizontally, yet orthogonal to each other. The arrays may accommodate one or more objects 302 (FIG. 3B) placed over the conveyor module 100.

In some embodiments, the plurality of rotating disks 104 comprise a top 106 that is circular. In an example, the plurality of rotating disks 104 arranged as arrays help to accommodate one or more objects 302. In some embodiments, the top 106 is concave. Each rotating disk 104 may include a gripping surface 108 to accommodate the one or more objects 302. In some embodiments, the gripping surface 108 is convex. In some embodiments, the gripping surface 108 may rest over the top 106. In an example, the top 106 (concave) and the gripping surface 108 (convex) provide stable surface for the one or more objects 302.

Further, in some embodiments, the gripping surface 108 is annular and comprised of an elastomer. In an example, the gripping surface 108 may be ring shaped depicting the annular surface. The gripping surface 108 may be made of an elastomer. In an example, the elastomer may be rubber like material. The elastomer conforms flexibility to attain the annular shape and grip to stabilize the one or more objects 302. Further, the gripping surface 108 may ensure even distribution of pressure on each rotating disk of the plurality of rotating disks 104 to grip the one or more objects 302 and prevent slippage. Further, in some embodiments, the gripping surface 108 may define a plurality of grooves 110 that extend radially. The plurality of grooves 110 may provide traction that ensures the gripping surface 108 grips the one or more objects 302.

In some embodiments, the gripping surface 108 may be configured to grip and propel the one or more objects 302 placed over the conveyor module 100 in one or more directions based on rotation of the plurality of rotating disks 104. In some embodiments, the one or more directions may be a linear direction movement (e.g., a movement that is parallel to a side of the conveyor module 100), diagonal direction movement (e.g., a movement that extends diagonally across a surface of the conveyor module 100), or a rotational direction movement. In some embodiments, the conveyor module 100 may comprise a plurality of motors, each motor may be coupled to a corresponding rotating disk of the plurality of rotating disks 104. Each motor of the plurality of motors is configured to rotate the corresponding rotating disk of the plurality of rotating disks 104 in a clockwise direction, an anti-clockwise direction, or both.

In some embodiments, each motor of the plurality of motors may be a rotating permanent magnet synchronous motor (PMSM). In an example, the rotating PMSM may be a type of electric motor where the rotor, embedded with permanent magnets, rotates horizontally (for example, parallel to the base 102). The rotor of the horizontally rotating PMSM rotates synchronously with the help of at least one control unit.

In some embodiments, the at least one control unit is communicatively coupled to each motor of the plurality of motors. In some embodiments, the at least one control unit may receive an instruction related to a destination or a sorting criteria of each of the one or more objects 302 from one or more input sources. In an example, the one or more input sources may be a barcode reader or a radio frequency based identification (RFID) reader. In another example, the sorting criteria may be dependent on the destination. In an example, the at least one control unit may receive instruction from the one or more input sources. In an example, the one or more input source may determine the destination of the one of one or more packages. Based on the destination, the at least one control unit may determine the sorting criteria, for example—distance between the one of one or more objects 302 and the destination, a path towards the destination, etc.

In some embodiments, the at least one control unit, based on the instructions, may generate electronic signals to rotate at least some of the plurality of motors and the corresponding plurality of rotating disks 104 in a clockwise or an anti-clockwise direction. The at least one control unit, based on the instructions, may generate electronic signals to rotate at least some of the plurality of motors and the corresponding plurality of rotating disks 104 in the other of the clockwise or the anti-clockwise direction. In some embodiments, the at least one control unit may generate electronic signals to rotate the plurality of motors of each of the plurality of rotating disks 104 at equal speeds to propel the one or more objects 302 in the one or more directions. In some embodiments, the at least one control unit via the plurality of motors may rotate some of the plurality of rotating disks 104 at different speeds than other rotating disks 104 to propel the one or more objects in the one or more directions. Further, in some embodiments, the at least one control unit via the plurality of motors may rotate some of the plurality of rotating disks 104 clockwise and other rotating disks 104 anti-clockwise to propel the one or more objects 302 in the one or more directions. At least some of the plurality of rotating disks 104 may counter-rotate with respect to other rotating disks 104 to provide the linear direction movement or diagonal direction movement to the one or more objects 302.

In some embodiments, the at least one control unit, based on the instructions, may generate electronic signals to rotate the plurality of motors and the corresponding plurality of rotating disks 104 either in a clockwise or an anti-clockwise direction. In an example, the conveyor module 100 may comprise at least sixteen rotating disks 104. Each of the plurality of rotating disks 104 may rotate on an axis that is orthogonal to a plane defined by an upper surface 112 of the base 102. In an example, the rotor of the plurality of rotating disks 104 rotates along an axis perpendicular (i.e., orthogonal) to the plane defined by the upper surface 112 of the base 102. As illustrated in FIG. 2A, the conveyor module 100 may comprise at least four arrays of the plurality of rotating disks 104, for example, a first array 200, a second array 202, a third array 204, and a fourth array 206 having the plurality of rotating disks 104.

In an example, destination of the one or more objects 302 lie in front of the conveyor module 100, the at least one control unit may operate the rotors of the first two arrays of the plurality of rotating disks 104 in opposite direction to the rotors of the other two arrays of the plurality of rotating disks 104. For example, the at least one conveyer unit may rotate each of the plurality of rotating disks 104 of the first array 200 and second array 202 in anticlockwise direction and each of the plurality of rotating disks 104 of the third array 204 and fourth array 206 in clockwise direction in order to propel the one or more objects 302 in a forward direction 208, towards the destination.

As illustrated in FIG. 2B, in another example, destination of the one or more objects 302 lie diagonally to the conveyor module 100, the at least one control unit may deactivate the rotors of a fifth array 210 (assumed diagonally) of the plurality of rotating disks 104. Further, the at least one control unit may actuate rotors of the plurality of motors of plurality of rotating disks 104, arranged left to the fifth array 210 (assumed diagonally) in anticlockwise direction. Furthermore, the at least one control unit may actuate rotors of the plurality of motors of plurality of rotating disks 104, arranged right to the fifth array 210 (assumed diagonally) in clockwise direction. For example, the at least one conveyer unit may rotate some rotating disks 104 of the plurality of rotating disks 104 (apart from the firth array) in anticlockwise direction and some rotating disks of the plurality of rotating disks 104 (apart from the fifth array) in clockwise direction in order to propel the one or more objects 302 in a diagonal direction 212, towards the destination.

As illustrated in FIG. 2C, in an example, the one or more objects 302 may need to be propelled in rotational direction movement to reach the destination. In an example, the one or more objects 302 may be placed over the conveyor module 100 such that the one or more objects 302 may be supported by at least four rotating disks of the plurality of rotating disks 104. Based on the instructions from the one or more input sources, the at least one control unit may rotate the motor of the at least four rotating disks of the plurality of rotating disks 104 in clockwise direction in order to turn the one or more objects 302. In an instance, if the one or more objects 302 need to be rotated in the left direction turn, the at least four rotating disks of the plurality of rotating disks 104 may be actuated in anticlockwise direction. In another instance, if the one or more objects 302 need to be rotated in the right direction turn 214, the at least four rotating disks of the plurality of rotating disks 104 may be actuated in clockwise direction.

In some embodiments, the conveyor module 100 may comprise a plurality of locking units 114 on an upper surface 112 of the base 102. Each of the plurality of locking units 114 may interlock the conveyor module 100 with another conveyor module 100. Further, the base 102 may comprise a plurality of connecting pins 116 on each side of the base 102. Each of the plurality of connecting pins 116 may electrically couple the conveyor module 100 with the another conveyor module 100. In an example, the conveyor module 100 may be interlocked and electrically connected with one or more of the conveyor modules 100 to install multiple conveyor module(s) 100 interconnected with each other. Furthermore, the conveyor module 100 may comprise a plurality of slots 118 coupled with the plurality of locking units 114 to interlock the conveyor module 100 with the another conveyor module 100.

FIG. 3A illustrates a top view of a conveyor system 300 having the conveyor module 100 interlocked with another conveyor module 100, in accordance with an alternate embodiment of the present disclosure. FIGS. 3B-3C illustrate a top view of the conveyor system 300 propelling one or more objects 302 in a linear direction, in accordance with an example embodiment of the present disclosure. FIGS. 3D-3E illustrate a top view of the conveyor system 300 propelling one or more objects 302 in a left diagonal direction, in accordance with an example embodiment of the present disclosure.

In some embodiments, as illustrated in FIG. 3A, one of the conveyor module 100 may be interlocked with three more conveyor module(s) 100. The conveyor module 100 may comprise the plurality of locking units 114 on the upper surface 112 of the base 102. Each of the plurality of locking units 114 may be quarter turn locks. In some embodiments, the plurality of locking units 114 may correspond to tool operated quarter turn locks having a torx head screw. The torx head screw of each of the plurality of locking units 114 may be adapted to be engaged with a wrench.

In some embodiments, some of the plurality of locking units 114 may be male quarter turn wrench locks and other of the plurality of locking units 114 may be female quarter turn wrench locks. In an example, each of the male quarter turn wrench locks may comprise a protruding stud and each of the female quarter turn locks may comprise a receptacle. The protruding stud may be designed complementary to the shape of the receptacle such that the protruding stud may be engaged with the receptacle to lock the plurality of locking units 114. Further, the protruding stud may be disengaged with the receptacle to unlock the plurality of locking units 114. In some embodiments, the torx head screw may be rotated anticlockwise or clockwise by using the wrench to lock or unlock the plurality of locking units 114.

In an example, the upper surface 112 of the base 102 may comprise at least four edges. Further, the plurality of locking units 114 may be installed on each edge of the upper surface 112. In an example, one of the at least four of the plurality of locking units 114 of the conveyer module 100 may be engaged with the plurality of locking units 114 of the other conveyor module 100. Further, in some embodiments, the conveyor module 100 comprises a plurality of connecting pins 116 on each side of the base 102. Each of the plurality of connecting pins 116 may electrically couple the conveyor module 100 with the another conveyor module 100. In an example, the plurality of connecting pins 116 may be pogo pins also known as spring loaded connectors. The plurality of connecting pins 116 may be spring loaded electronic connectors. The spring loaded electronic connectors may enable transfer of a data between the one conveyor module 100 and another conveyor module 100. In some embodiments, the data may comprise the destination, sorting criteria of the one or more objects 302.

In some embodiments, the at least one control unit of the conveyor module 100 may be electrically connected to the at least one control unit of the another conveyor module 100. In some embodiments, each of the at least one control unit may include suitable logic, circuitry, and/or interfaces that are operable to execute one or more instructions stored in the memory to perform predetermined operations. In one embodiment, the at least one control unit may be configured to decode and execute any instructions received from one or more other electronic devices or server(s). The at least one control unit may be configured to execute one or more computer-readable program instructions, such as program instructions to carry out any of the functions described in this description. In an example, the at least one control unit may process one or more instructions to operate the conveyor module 100. Further, at least one control unit may be configured to operate the rotors of the plurality of rotating disks 104 of the conveyor module 100.

As illustrated in FIGS. 3B-3C, the at least one control unit may generate electronic signals for conveyor module 100 and the other conveyor modules 100 on the basis of information from one or more input sources. The one or more input sources may be barcode scanner or RFID scanner. The one or more input sources may determine the destination and sorting criteria of the one or more objects 302. In an example, the conveyor module 100 may be interlocked and electronically connected with other at least three conveyor module(s) 100, as illustrated in FIG. 3A. The conveyor module 100 may be interlocked with other at least three conveyor module(s) 100 via the plurality of locking units 114. The conveyor module 100 may be electronically connected with other at least three conveyor module(s) 100 via the plurality of connecting pins 116.

In an alternative embodiment, the one or more objects 302 may be placed over the conveyor module 100, interlocked and electronically connected with the at least three more conveyor module(s) 100, referred herein as a conveyor system 300. As illustrated in FIGS. 3B-3C, at one or more objects 302 may be placed over the conveyor system 300. The one or more objects 302 may be stably placed over the gripping surface 108 of the plurality of rotating disks 104. In an example, the conveyor system 300 may be installed in a warehouse where the one or more objects 302 may be sorted in different packages. In an example, the packages may be placed near the conveyor system 300. The one or more objects 302 that need to be sorted in the packages may be placed over the conveyor system 300 and the plurality of rotating disks 104 of the conveyor system 300 may propel the one or more objects 302 towards the packages.

In an example, one of the packages may be placed diagonally to the conveyor system 300. The at least one control unit may determine the destination and sorting criteria of the one or more objects 302 that are supposed to be sorted in one of the packages placed diagonally. Accordingly, the at least one control unit may process the instructions from the one or more input sources to determine a sorting path for the one or more objects 302. The sorting path may be combination of movement of the one or more objects 302 in one or more directions. The sorting path may be combination of a linear direction movement, diagonal direction movement, or a rotational direction movement of the one or more objects 302. In an example, as illustrated in FIGS. 3B-3C, the at least one control unit generate electronic signals towards the conveyor module(s) 100 of the conveyor system 300. The at least one control unit may operate the rotors of the plurality of rotating disks 104 to rotate the plurality of rotating disks 104 in a synchronized manner.

In some embodiments, the at least one control unit may operate the rotors of the plurality of rotating disks 104 to rotate the plurality of rotating disks 104 either in a clockwise or an anti-clockwise direction in order to propel the one or more objects 302 in a linear direction movement (as explained in FIG. 2A). Further, as illustrated in FIGS. 3D-3E, the at least one control unit may operate the rotors of the plurality of rotating disks 104 to counter rotate the at least some of the plurality of rotating disks 104 with respect to the other rotating disks 104 to provide the diagonal direction movement to the one or more objects 302. In an example, at least one control unit of each of the conveyor module(s) 100 of the conveyor system 300 to counter rotate at least some of the plurality of rotating disks 104 with respect to the other rotating disks 104 to provide linear direction movement, followed by the diagonal direction movement to the one or more objects 302.

FIGS. 4A-4D illustrate a top view of the conveyor system 300 propelling one or more objects 302 in a right diagonal direction, in accordance with an example embodiment of the present disclosure.

In some embodiments, each motor of the plurality of motors is coupled to a corresponding rotating disk of the plurality of rotating disks 104 of the conveyor system 300. Each motor may rotate the corresponding rotating disk either in a clockwise or an anti-clockwise direction depending upon the one or more directions where the one or more objects 302 need to be propelled by the conveyor system 300. In some embodiments, the plurality of motors may rotate each of the plurality of rotating disks 104 of the conveyor system 300 at equal speeds to propel the one or more objects 302 in the one or more directions. In some embodiments, the plurality of motors may rotate some of the plurality of rotating disks 104 of the conveyor system 300 at different speeds than other rotating disks 104 to propel the one or more objects 302 in the one or more directions. In some embodiments, the plurality of motors may rotate some of the plurality of rotating disks 104 clockwise and other rotating disks 104 anti-clockwise to propel the one or more objects 302 in the one or more directions. Further, the at least some of the plurality of rotating disks 104 may counter-rotate with respect to other rotating disks 104 to provide the linear direction movement or diagonal direction movement to the one or more objects 302.

In an example, the one or more objects 302 may be sorted in a package placed at right diagonal corner of the conveyor system 300. The at least one control unit may determine a sorting path. Further, the control unit may provide electronic signals towards the conveyor module 100 of the conveyor system 300 depending on the sorting path of the at least one object 302. The corresponding control units may operate the plurality of rotors of corresponding rotating disks of the plurality of rotating disks 104.

Figure 4A:
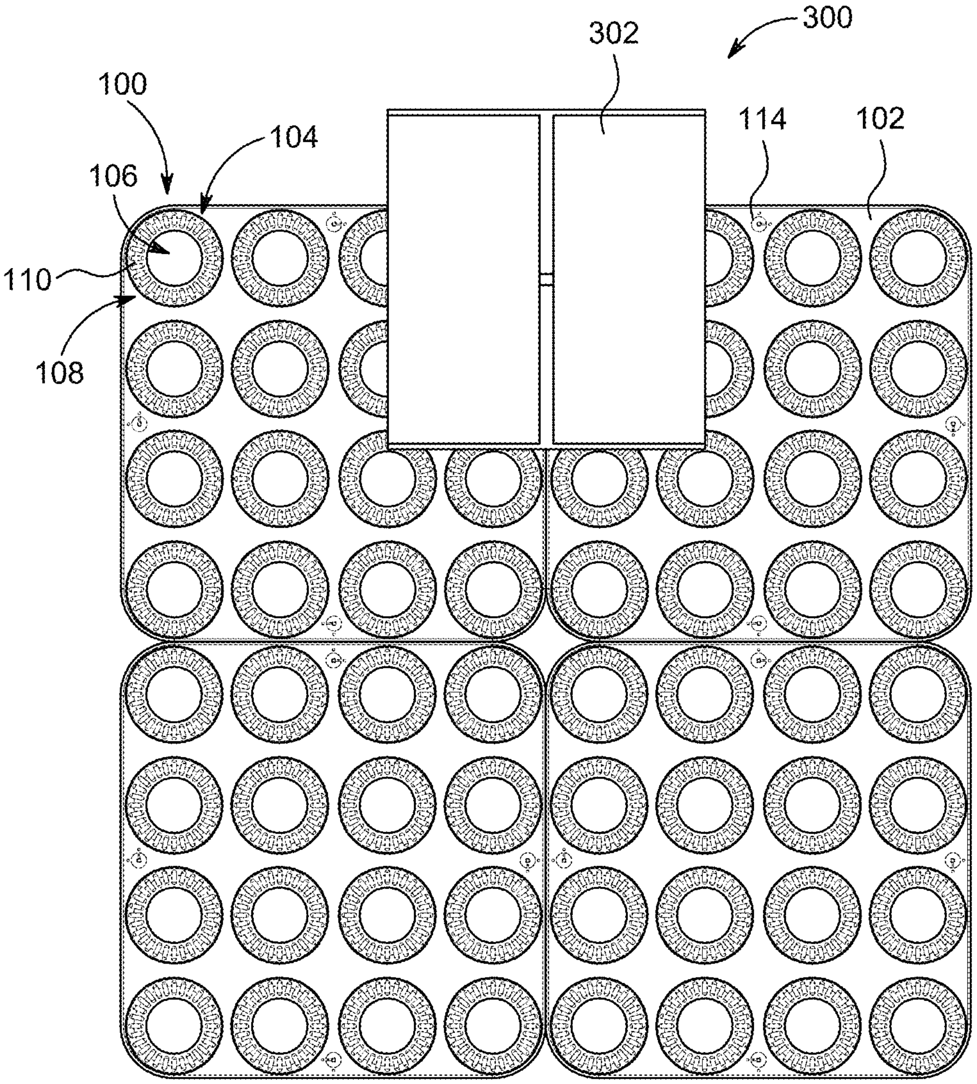
Figure 4B:
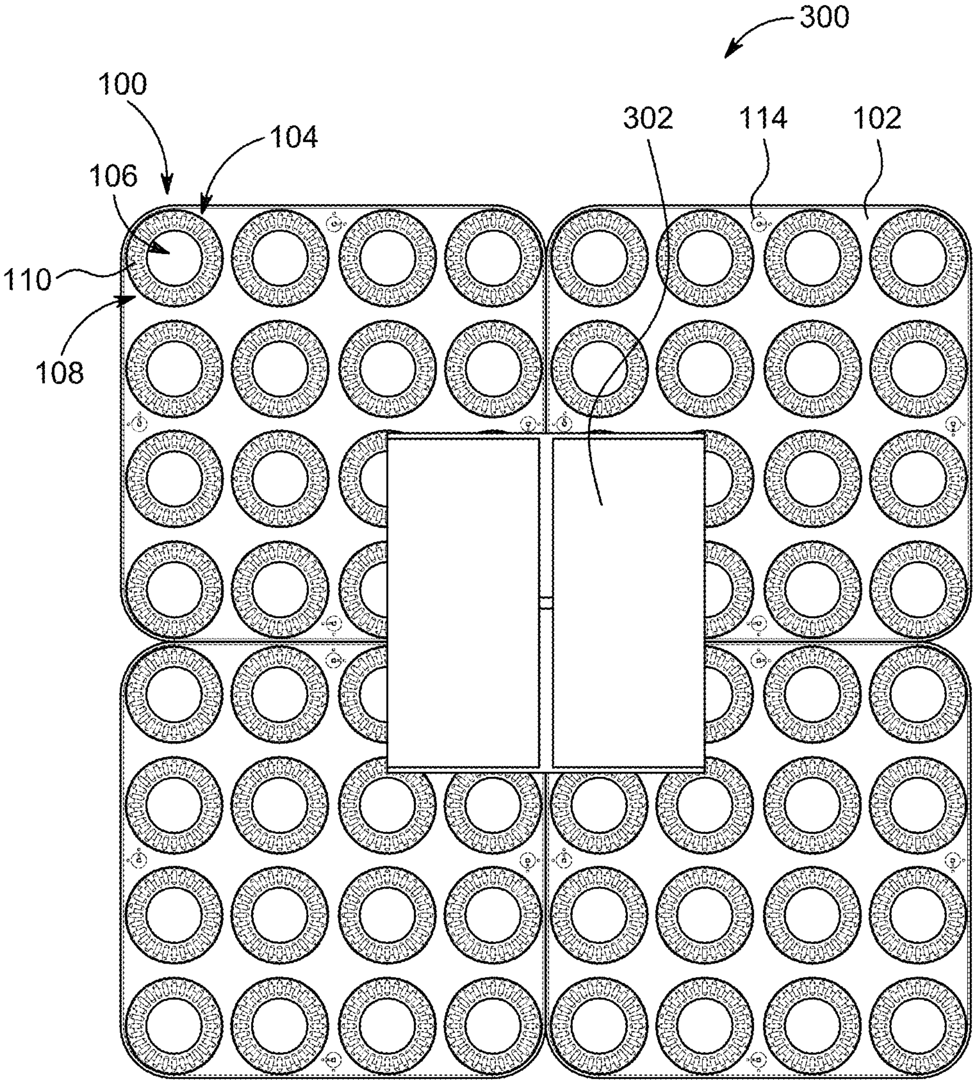
Figure 4C:
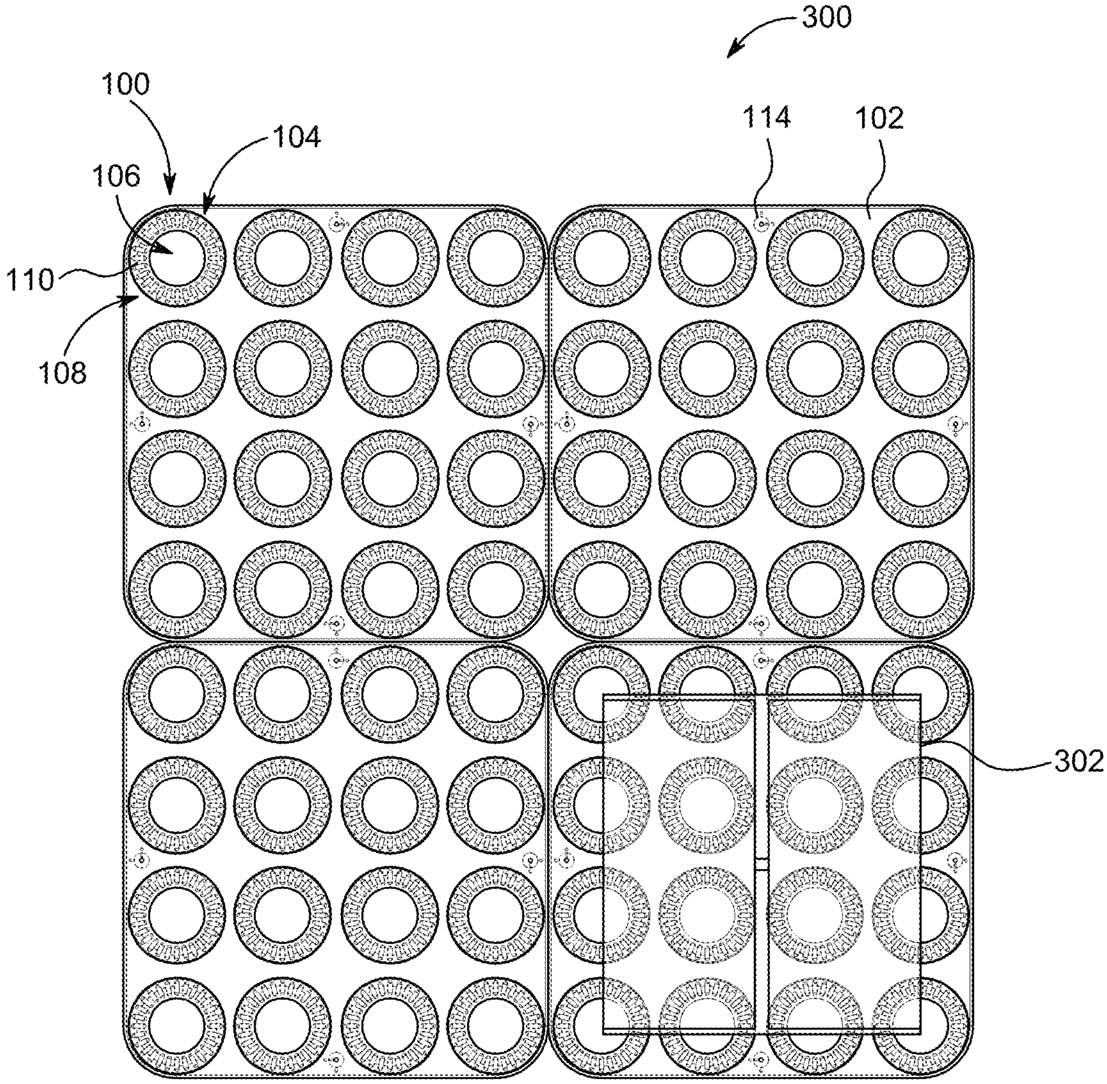
Figure 4D:
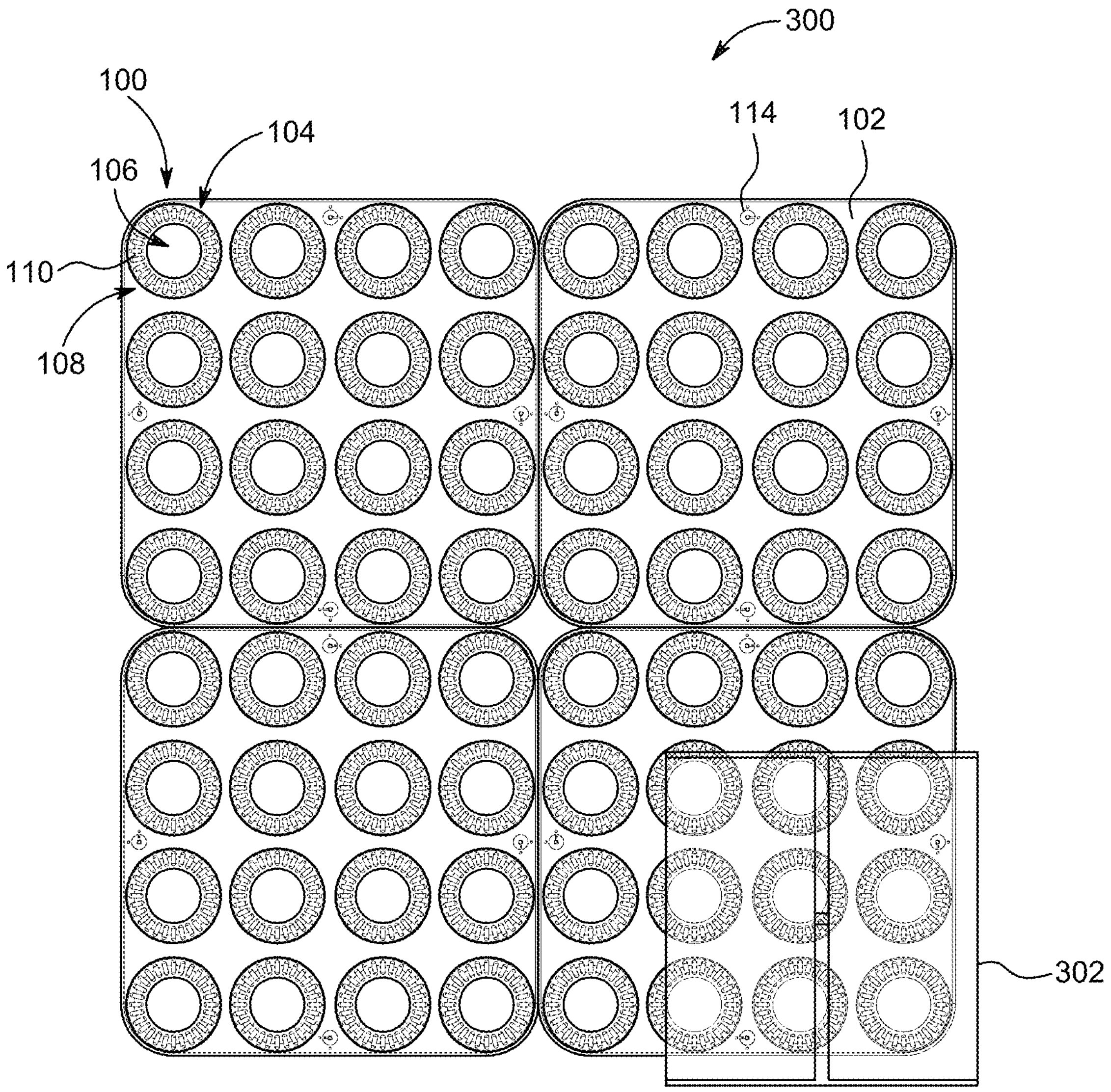

In some embodiments, the plurality of motors may rotate some of the plurality of rotating disks 104 clockwise and other rotating disks 104 anti-clockwise to propel the one or more objects 302 in the linear direction or forward direction as illustrated in FIGS. 4A-4B. Further, at least some of the plurality of rotating disks 104 may counter-rotate with respect to other rotating disks 104 to provide the diagonal direction movement to the one or more objects 302 (as illustrated in FIGS. 4C-4D). In an example, the plurality of motors may rotate some of the plurality of rotating disks 104 clockwise and other rotating disks 104 anti-clockwise at equal speed to propel the one or more objects 302 in the forward direction. Furthermore, at least some of the plurality of rotating disks 104 may counter-rotate with respect to other rotating disks 104 at different speeds than other rotating disks 104, to provide the right diagonal direction movement to the one or more objects 302.

In some embodiments, the present disclosure provides a method. The method may comprise the steps of mounting the plurality of rotating disks 104 on the base 102 of the conveyor module 100. The each rotating disk of the plurality of rotating disks 104 may comprise the top 104 that is circular and the gripping surface 108 positioned around the top 104. In some embodiments, the gripping surface 108 may grip and propel the one or more objects 302 placed over the conveyor module 100 in one or more directions based on rotation of the plurality of rotating disks 104.

Embodiments may be configured to accommodate and propel the one or more objects 302 in one or more directions. Embodiments may be configured to propel the one or more objects 302 in a linear direction movement, diagonal direction movement, or a rotational direction movement based on destination and sorting criteria of the one or more objects 302.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A conveyor module comprising:
a base; and
a plurality of rotating disks mounted on the base, wherein each rotating disk of the plurality of rotating disks comprises:
a top that is circular; and
a gripping surface positioned around the top, wherein the gripping surface is configured to grip and propel one or more objects placed over the conveyor module in one or more directions based on rotation of the plurality of rotating disks, wherein the gripping surface is annular, and wherein the gripping surface defines a plurality of grooves that extend radially.

2. The conveyor module of claim 1, further comprising a plurality of quarter-turn locks on an upper surface of the base of the conveyor module, wherein each of the plurality of quarter-turn locks is configured to interlock the conveyor module with another conveyor module.

3. The conveyor module of claim 2, further comprising a plurality of connecting pins on each side of the base, wherein each of the plurality of connecting pins is configured to electrically couple the conveyor module with the another conveyor module.

4. The conveyor module of claim 3, wherein each of the plurality of connecting pins are pogo pins.

5. The conveyor module of claim 2, wherein the conveyor module comprises at least sixteen rotating disks, wherein each of the plurality of rotating disks is configured to rotate on an axis that is orthogonal to a plane defined by an upper surface of the base.

6. The conveyor module of claim 1, wherein the one or more directions comprise at least one of a linear direction movement, diagonal direction movement, or a rotational direction movement.

7. The conveyor module of claim 6, wherein each of the plurality of rotating disks is configured to rotate either in a clockwise or an anti-clockwise direction.

8. The conveyor module of claim 7, wherein each of the plurality of rotating disks is configured to rotate at equal speeds to propel the one or more objects in the one or more directions, and wherein some of the plurality of rotating disks are configured to rotate at different speeds than other rotating disks to propel the one or more objects in the one or more directions.

9. The conveyor module of claim 7, wherein some of the plurality of rotating disks are configured to rotate clockwise and other rotating disks are configured to rotate anti-clockwise to propel the one or more objects in the one or more directions, and wherein at least some of the plurality of rotating disks are configured to counter-rotate with respect to other rotating disks to provide the linear direction movement or diagonal direction movement to the one or more objects.

10. The conveyor module of claim 1, wherein the base of the conveyor module defines a shape, and wherein the shape is a square shape.

11. The conveyor module of claim 1, further comprising a plurality of adjustable feet coupled to a lower surface of the base, wherein the plurality of adjustable feet provides a support for positioning the conveyor module over a stable surface.

12. The conveyor module of claim 1, wherein the top is concave.

13. The conveyor module of claim 1, wherein the gripping surface is comprised of an elastomer, and wherein the gripping surface is convex.

14. The conveyor module of claim 1, wherein the plurality of rotating disks is arranged linearly to form a plurality of arrays, wherein the plurality of arrays is aligned parallel to at least one side of the conveyor module, orthogonal to at least one side of the conveyor module, or diagonally along a top surface of the conveyor module.

15. A method comprising:

mounting a plurality of rotating disks on a base of a conveyor module, wherein each rotating disk of the plurality of rotating disks comprises:

a top that is circular; and a gripping surface positioned around the top, wherein the gripping surface is configured to grip and propel one or more objects placed over the conveyor module in one or more directions based on rotation of the plurality of rotating disks, wherein the gripping surface is annular, and wherein the gripping surface defines a plurality of grooves that extend radially.

16. The method of claim 15, further comprising a plurality of quarter-turn locks on an upper surface of the base of the conveyor module, wherein each of the plurality of quarter-turn locks is configured to interlock the conveyor module with another conveyor module.

17. The method of claim 16, further comprising a plurality of connecting pins on each side of the base, wherein each of the plurality of connecting pins is configured to electrically couple the conveyor module with the another conveyor module, wherein each of the plurality of connecting pins are pogo pins.

18. The method of claim 15, wherein the one or more directions comprise at least one of a linear direction movement, diagonal direction movement, or a rotational direction movement.

19. The method of claim 15 further comprising rotating at least some of the plurality of rotating disks either in a clockwise or an anti-clockwise direction.

20. The method of claim 19, further comprising:

rotating each of the plurality of rotating disks at equal speeds to propel the one or more objects in the one or more directions, or rotating some of the plurality of rotating disks at different speeds than other rotating disks to propel the one or more objects in the one or more directions.

* * * * *